Walter G. Marskell
John M. Miller
Inventors

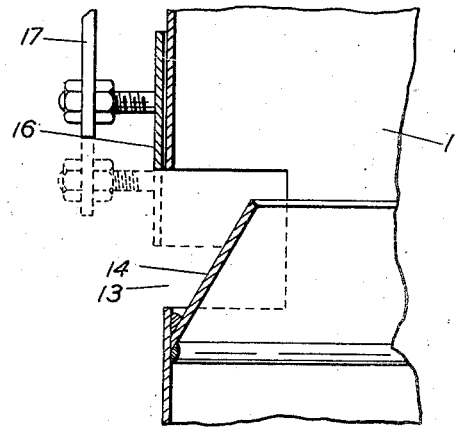
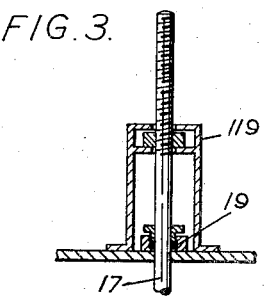
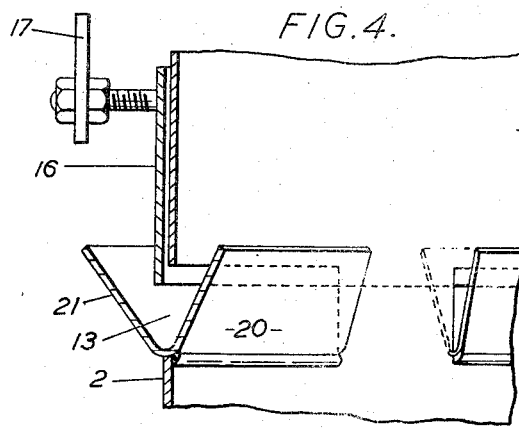

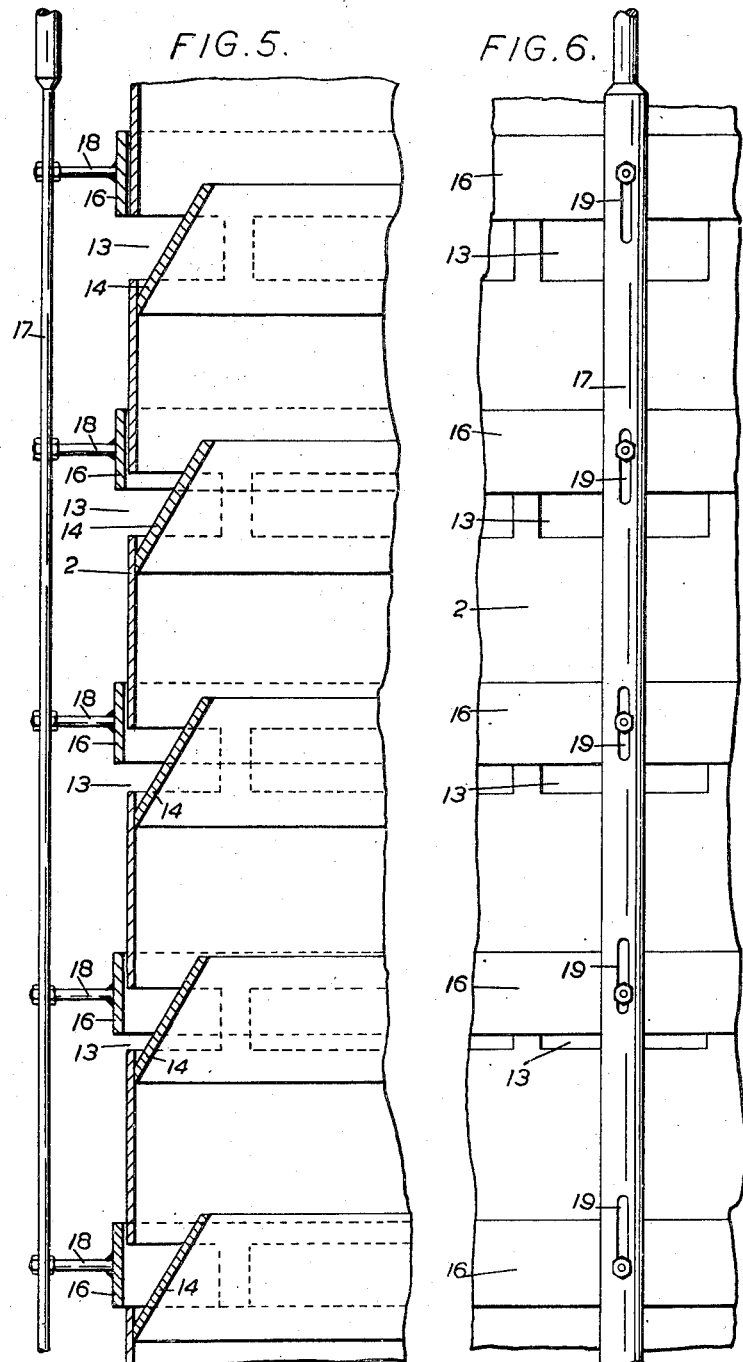

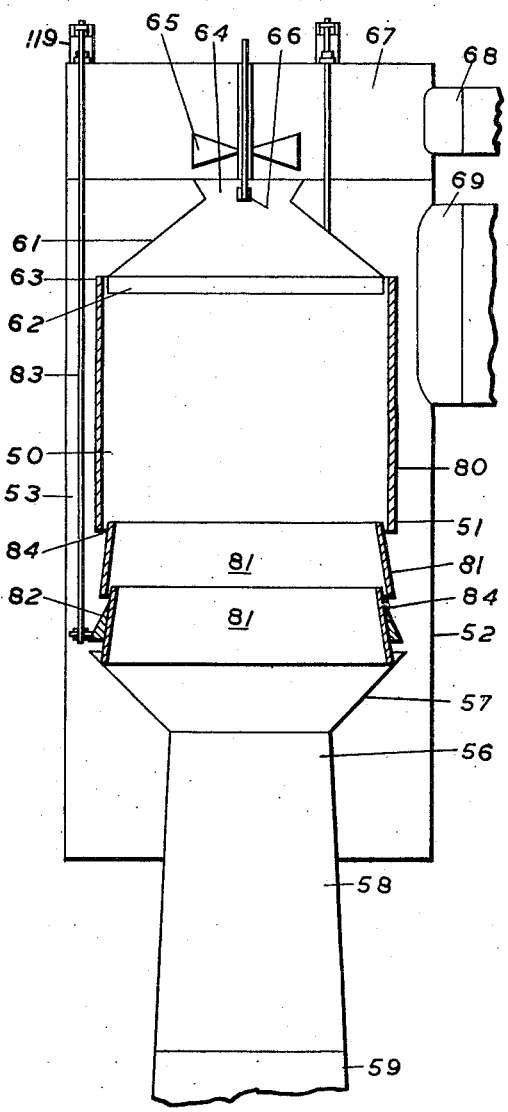

July 27, 1954  W. G. MARSKELL ET AL  2,684,573
MEANS FOR REGULATING GASEOUS FLUID
FLOW TO COMBUSTION APPARATUS
Filed Dec. 9, 1950   7 Sheets-Sheet 5
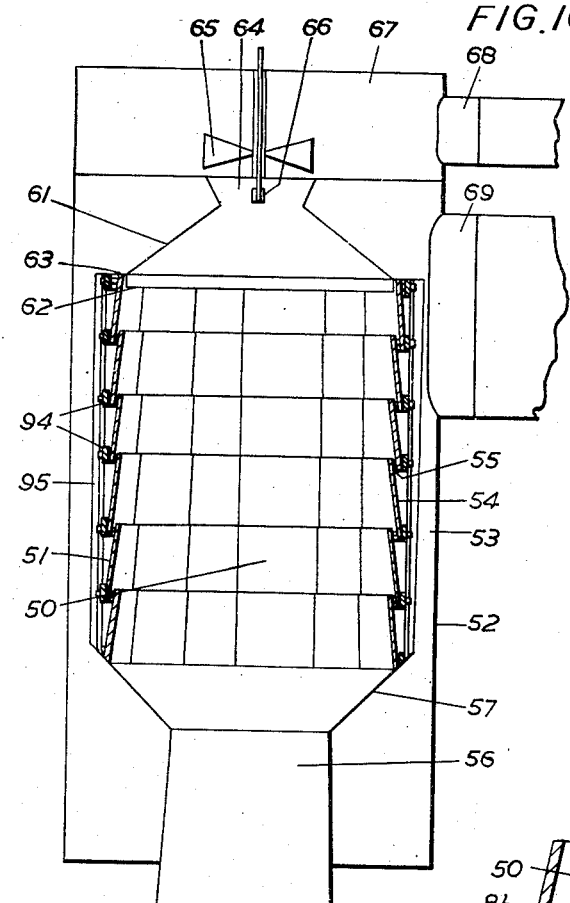
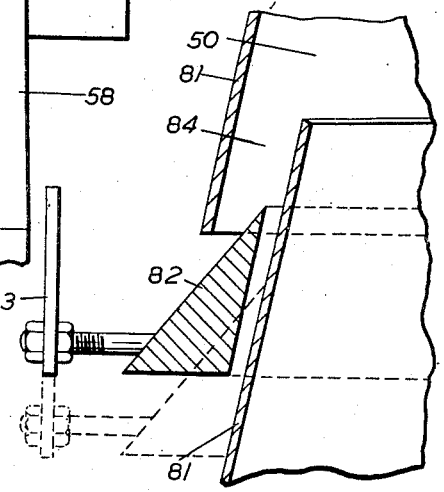
Inventors
WALTER G. MARSKELL
JOHN M. MILLER
By
*J. P. Moran*
Attorney

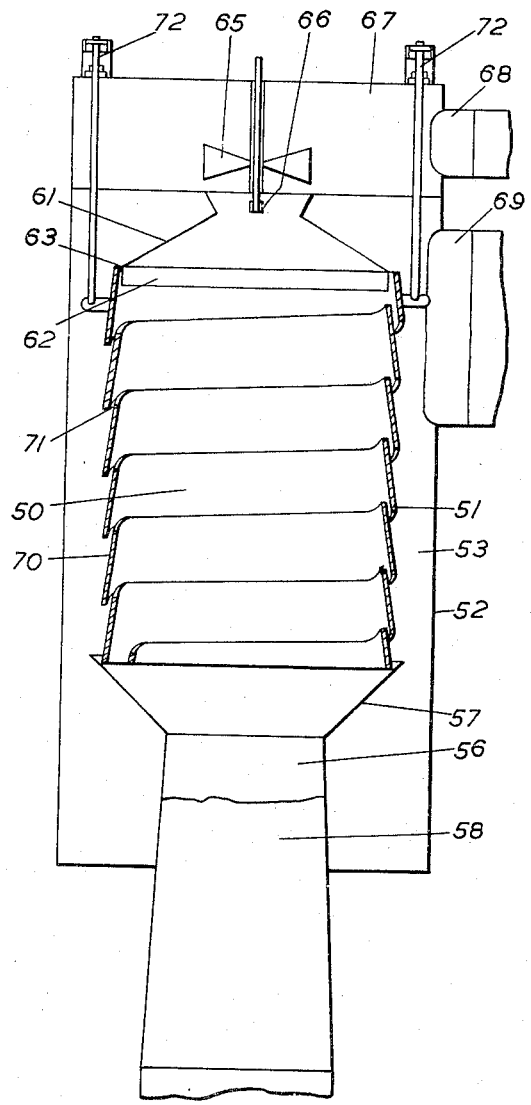

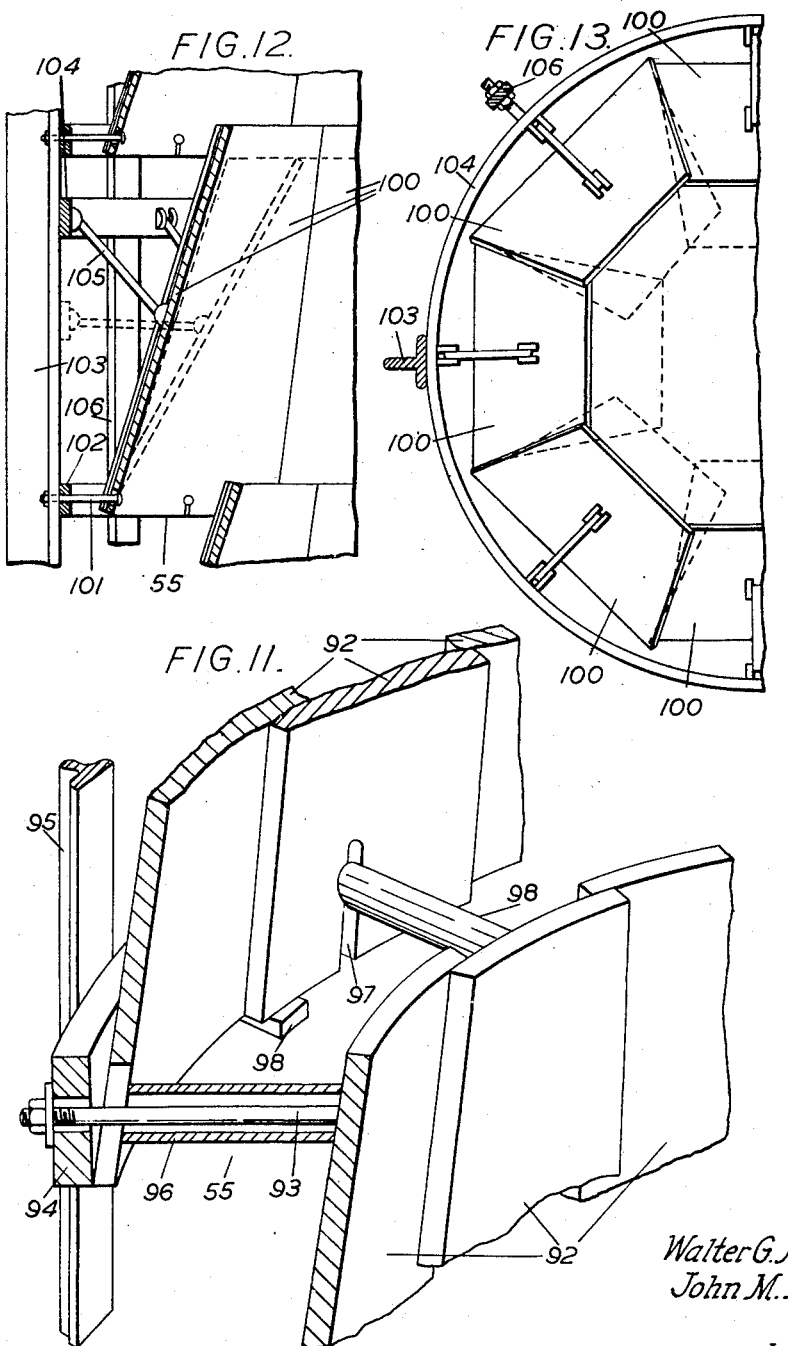

Patented July 27, 1954

2,684,573

UNITED STATES PATENT OFFICE 2,684,573

MEANS FOR REGULATING GASEOUS FLUID FLOW TO COMBUSTION APPARATUS

Walter G. Marskell, Kilmacolm, and John M. Miller, Brookfield, Scotland, assignors to The Babcock & Wilcox Company, New York, N. Y., a corporation of New Jersey Application December 9, 1950, Serial No. 200,053

Claims priority, application Great Britain December 12, 1949

13 Claims. (Cl. 60—39.23)

This invention relates to combustion apparatus and more particularly to apparatus adapted to supply gases under pressure and at moderate temperature for use, for example, in a gas turbine. In view of the pressure involved, it is desirable in such apparatus for rapid combustion to take place in a small space at high temperature. Since to water cool the walls of the combustion space is generally disadvantageous, the utilisation of tempering gas for reducing the temperature of the combustion products and to cool a wall enclosing the combustion and mixing chamber is desirable. The tempering gas should be introduced into the chamber with the smallest possible pressure drop and in such manner that the combustion process is not deleteriously affected, that mixing of the combustion products and tempering air is promoted and that the wall is adequately protected from over-heating. Since operating conditions are liable to vary, the desirability may arise of varying the inlet velocity of the tempering gas within the permitted limits of pressure drop or/and the distribution of the tempering gas within the chamber. An object of the invention is the provision of improved combustion apparatus incorporating means for controlling the inflow of tempering gas into a combustion and mixing chamber.

The present invention includes combustion apparatus comprising an outer casing adapted to resist internal pressure, an inner wall disposed within the outer casing, surrounded by a gas flow passage and enclosing a combustion and mixing chamber arranged to receive fuel at one end thereof and provided with an outlet for combustion and tempering gases at the other end thereof, which inner wall is formed with tempering gas inlet means including at least one port or group of ports extending around the wall and having associated therewith means for regulating the effective flow area thereof.

The invention will now be described, by way of example, with reference to the accompanying partly diagrammatic drawings, in which:

Figures 2 and 3 are enlarged views of parts of Figure 1;

Figure 4 illustrates a modification of the apparatus of Figures 1 to 3;

Figure 5 illustrates another modification of the apparatus of Figures 1 to 3;

Figure 6 is a view from outside the combustion chamber of the parts shown in Figure 5;

Figure 7 is an elevation of another combustion apparatus in section on the axis of a combustion chamber thereof;

Figure 8 is an enlarged view of part of Figure 7, with a movable part, however, shown in a different position;

Figure 9 is an elevation of another combustion apparatus in section on the axis of a combustion chamber thereof;

Figure 10 is an elevation of another combustion apparatus in section on the axis of a combustion chamber thereof;

Figure 11 is an enlarged view of part of Figure 10, but shown in perspective; and Figure 12 illustrates in sectional elevation, and Figure 13 in sectional plan, a modification of the apparatus of Figures 10 and 11.

Figure 1:
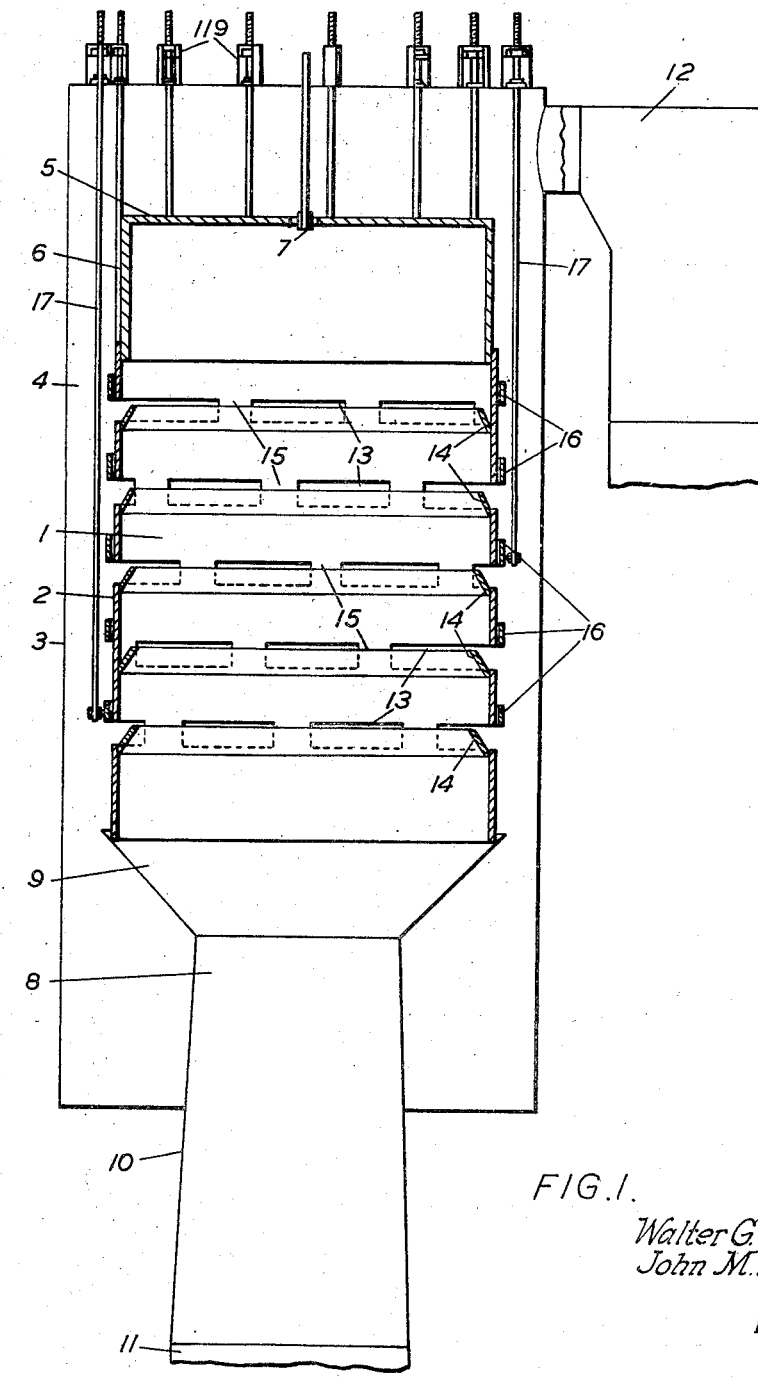
Figure 1 is an elevation of a combustion apparatus for supplying gases for a gas turbine, in section on the axis of a combustion chamber thereof.

Referring to Figures 1 to 3 of the accompanying drawings, a combustion and mixing chamber 1 enclosed by a cylindrical metallic inner wall 2 is arranged with its axis upright and is surrounded by an outer casing 3 adapted to resist internal pressure and spaced from the combustion chamber so as to leave an air flow passage 4 between the wall and the casing. The top of the combustion chamber is closed by a flat-topped cowl 5 secured at the lower end of a depending cylindrical part 6 thereof to the upper end of the inner wall 2. At the axis of the combustion chamber near the plane of the upper wall of the cowl is an air atomizing oil burner 7 arranged to direct a combustible spray of oil downwardly. Leading from the chamber at the lower end thereof is an outlet duct 8 having an upper sharply converging part 9 on which the inner wall 2 is suitably supported and a lower part 10 which extends through the lower wall of the outer casing 3 and gradually diverges to a conduit 11 leading to the gas turbine Combustion is supported, cooling of metal parts effected, and the gases for use tempered, by air which is introduced within the outer casing near the top thereof by an air duct 12. The inner wall 2 is pierced by peripherally extending slots 13 arranged in five spaced annular rows. With each row is associated an internal deflecting ring 14 of frusto-conical form which is secured by welding its lower edge to the wall adjacent the level of the lower edges of the slots and whose upper edge is below the upper edges of the slots. The slots in the different rows are staggered, so that the wall parts 15 between the slots in each of the upper four rows are vertically above slots in the row next below.

With each row of slots is associated a masking ring 16 extending around the inner wall 2, which is of sufficiently larger diameter than the wall 2 to allow of easy movement axially thereof under all conditions but is sufficiently close to the wall to be able effectively to mask the slots of the row. Each masking ring 16 is positioned by three rods 17 which extend upwardly from lugs at equidistantly spaced points on the ring through the pressure casing 3 through glands 18 (Figure 3) to nuts 19 mounted in brackets 119, by which nuts the rods are secured in desired position and by turning which the masking ring may be raised or lowered.

In operation, air flows over the outside of the cowl 5 and generally downwardly in the air flow passage 4 and assists in cooling the cowl and in passing over the outer surface of the wall 2 and the inner surface of the outer casing 3 assists in cooling the wall and the casing. The air then enters through the slots 13 into the combustion chamber 1, where it supports combustion of the fuel, dilutes the products of combustion, and cools inner surfaces of the wall 2 and the cowl 5. In view of the substantial number of slots, the pressure difference between the air flow passage 4 and the combustion chamber 1 is small, and in view of the short distance between adjacent rows of slots the cooling of the wall 2 is effective. The air entering the combustion chamber through the slots 13 is supplied by the deflecting vanes with an upward component of motion which has the result of establishing or increasing turbulence within the combustion chamber. The air is so admitted to the combustion chamber that combustion therein is not adversely affected, and the turbulence hastens complete combustion and the production of a suitably tempered gas stream of substantially uniform temperature. Turbulence of air in contact with the inner surface of the wall 2 promotes cooling of that wall.

The outlet duct 8 of converging-diverging form assists in ensuring that the gases reaching the turbine are of substantially uniform temperature.

In the region of the oil spray from the burner 7 there is a downward movement of air for first establishing combustion of issuing oil which air has been deflected upwardly into parts of the space within the cowl laterally of the burner upon entering the combustion chamber. It will be observed that much of the metal of the cowl is remote from the flame, while the outer surface of the cowl is traversed by substantially all the air supplied to the combustion apparatus.

The masking rings 16 are suitably positioned with respect to the slots. Thus at high loads they may be all clear of the slots 13 as shown in Figure 1 and in full lines in Figure 2, while at low loads in order to achieve proper mixing between tempering air and tempering gases, and proper protection of the metal of the wall 2, it may be necessary to supply the appropriate air quantity in greater proportion near the top of the combustion chamber and lower rows of slots may be either substantially wholly masked or partly masked by adjustment of the masking ring 16 to a position such as that shown in dotted lines in Figure 2.

At low loads the air supplied is normally reduced in quantity and the air velocities through the slots tend to be reduced but such velocities may be maintained at a desired value by reducing the flow areas through the slots by means of the masking rings.

If a change is made to more slowly burning fuel it may be desirable to close upper slots partially so as to admit a greater proportion of air in the lower part of the combustion chamber.

If instead of masking the slot from the top edge of the slot as shown in dotted lines in Figure 2 the masking ring is moved downwardly to a position in which the slot is masked to the same extent from the bottom edge of the slot, the air is deflected by the deflecting ring to a lesser extent in the upward direction.

In the modification of the arrangement of Figures 1 to 3, shown in Fig. 9, the slots are arranged not in five rows but in one row extending helically around and along the inner wall and are associated with a helical deflecting ring and a single helical masking ring.

In the modification illustrated in Figure 4, the deflecting ring 14 associated with each row of slots 13 by which air passes through the inner wall 2 to the interior of the combustion chamber 1 is replaced by inner guide vanes 20 associated with the respective slots, each of which vanes forms part of a channel-shaped member having a rounded bottom and providing an outer guide vane 21 adapted to direct air flowing downwardly in the air flow passage 4 through the slot. The vanes diverge from one another upwardly from the lower edge of the slot, to which they are welded and overlap the wall above the slot so that a convergent entry and a divergent outlet to the air passage through the slot are formed even when the slot is not masked and radiant energy from the combustion chamber is intercepted before it can reach the outer casing. A masking ring 16, positioned by rods 17, is provided for reducing the air flow through the slot to a desired extent.

In the arrangements of Figures 1 to 3 means for securing the rods 17 in desired position permit adjustment of each masking ring 16 independently of the others. In the modification of the arrangement of Figures 1 to 3 illustrated in Figures 5 and 6, in which the same reference numerals as in Figures 1 to 3 represent corresponding items, masking rings 16 for the respective rows of slots 13 are operable simultaneously by a set of three circumferentially spaced adjusting rods 17, of which one is shown in the drawing, which extend at their upper ends outside the pressure casing. Each masking ring is secured to each adjusting rod by a bolt 18 which is securable at any desired position in a respective slot 19 in the adjusting rod 17. The rows of slots in the inner wall and the masking rings can be so arranged that movement of the adjusting rods effects masking of the different rows of slots to the same extents. As shown, however, although the rows of slots are of similar dimensions, the distances between adjacent masking rings are greater than the distances between the respective rows of slots, so that as the masking rings are moved simultaneously downwardly from a position in which all the slots are free, the rows of slots begin to be masked successively beginning with the lowermost slots, and by the time the lowermost row of slots is substantially completely masked the lower the slot the greater the extent of masking the same. Thus by lowering the adjusting rods at low loads the smaller quantity of air provided is admitted into the combustion chamber through smaller slot areas and therefore with maintenance of adequate upward and inward flow velocity while as may be desired in order to achieve proper mixing and metal protection a higher proportion of the air is admitted through upper rows of slots, perhaps it being desirable to admit substantially no air through the lowermost row or rows of slots.

Referring to Figures 7 and 8, a combustion and mixing chamber 50 enclosed by a metallic inner wall 51 is arranged with its axis upright and is surrounded by an outer casing 52 adapted to resist internal pressure and spaced from the combustion chamber so as to leave an air flow passage 53 between the inner wall and the casing. Leading from the chamber at the lower end thereof is an outlet duct 56 having an upper sharply converging part 57 and a lower part 58 which projects through the outer casing 52 gradually diverges to a conduit 59 leading to a gas turbine.

The inner wall consists of a cylindrical ring 80 of substantial length and two relatively short frusto-conical rings 81 at the lower end of the wall. The lower short ring is suitably supported by converging part 57 of the outlet duct and the upper short ring is supported by the lower short ring, and the cylindrical ring supported by the upper short ring, through suitable brackets, which space the rings so that ducts or nozzles 84 are left there between through which air from the passage 53 can enter the combustion chamber with an upward component of motion.

The top of the combustion chamber is fitted with a cowl 61 of which a depending part 62 projects with a certain clearance, to provide a peripheral inlet port 63, into the cylindrical ring 80. The cowl is independently supported and provides a central port 64 for the admission into the combustion chamber of primary air past an air register 65 and of fuel from a central burner 66 arranged in operation to direct a combustible spray of oil downwardly. A windbox 67 surrounds the central port and is supplied with primary air through a duct 68. With the upper part of the interior of the outer casing communicates a second duct 69 which supplies air for completing combustion and for cooling metal parts and tempering the gases produced.

In operation, air from the duct 69 flowing to and through the ducts 84 and adjacent the inner surfaces of the rings 80 and 81 effects cooling of the rings 80 and 81, assistance in the completion of combustion, and tempering of the gases produced.

A ring 82 of wedge-shaped cross-section encircles the lower frusto-conical ring and is movable by rods 83 so that the wedge may be located wholly below the duct 84 between the two frusto-conical rings 81 as shown in Figure 7 and in dotted lines in Figure 8, or may be located with the thin end of the wedge, as for instance shown in full lines in Figure 8, to a desired degree within the said duct in order to restrict the effective width thereof.

In the modification of the arrangement of Figure 7 shown in Figure 9, in which the same reference numerals as in Figure 6 denote similar items, the inner wall 51 consists of a helical metal strip 70 of which the lower edge is further from the combustion chamber axis than the upper edge thereof and of which the neighbouring edges of adjacent turns overlap to form a helical inwardly and upwardly inclined duct 71 through the wall. The uppermost and lowermost turns of the helix are tapered off, the latter is welded to the converging part 57 of the outlet duct 56, and to the former are attached rods 72 by which the overall length of the helix can be varied within limits in order to vary the width of the helical duct 71.

In the modification of the arrangement of Figure 7 shown in Figures 10 and 11, in which the same reference numerals as in Figure 7 refer to similar items as in Figure 7, the inner wall consists of a column of six similar frusto-conical rings 54 overlapping to provide inwardly and upwardly leading ducts 55 (Figure 11) therebetween, and each ring is formed of separate overlapping plates 92. The plates are supported at their lower edges by projections 98 on supporting rings 94, which rings encircle the inner wall and are welded to a number of uprights 95 whose lower ends rest upon the converging upper part 57 of the outlet duct. A stud 93 is welded to, screwed into, or cast with each plate adjacent the top edge thereof and where the rings overlap project through slots 97 in the lower parts of plates of the next adjacent upper ring, and through oversize bores in the supporting rings 94 to the outside thereof where they are provided with washers and nuts. Replaceable sleeve-like parts 96 through which the studs extend determine the widths of the ducts 55 between the rings.

Such construction possesses the advantage that a ring may readily be formed of highly heat resisting metal even if such metal is not readily workable to form frusto-conical rings but may be provided in the form of cast plates. Another advantage is that the plates are capable of independent expansion. Moreover replacement of areas of the wall is facilitated. The width of a duct may be regulated by substituting sleeve-like parts 96 of the appropriate different length and adjusting the nuts on the studs 93 appropriately.

In the modification of the arrangement of Figures 10 and 11 illustrated in Figures 12 and 13, the width of a duct between adjacent rings consisting of overlapping plates can be adjusted during operation. Each plate 100, which is flat, of a ring is supported near its lower end by a bolt 101 extending radially inwardly from a supporting ring 102 encircling the combustion chamber and secured to uprights 103. Each plate can rock on its bolt and its upward and inward inclination is determined by the axial position of an adjusting ring 104 encircling the combustion chamber, on which adjusting ring is pivoted an end of a link 105 the other end of which is pivotally connected to the plate 100 near the centre thereof. The adjusting ring 104 can be moved in the vertical direction by suitable rods 106 extending upwardly and to the outside of the pressure casing. Downward movement of the adjusting ring from the position shown in full lines to the position shown in dotted lines will effect an increase in the width of the duct 55 through which air is admitted to the combustion chamber between the ring and the superjacent ring owing to the rocking of the plates inwardly from the full line position to the dotted line position. Alternate plates overlap the remaining plates.

One or more of the illustrated constructions may also embody inventions the subject of claim in one or more of other U. S. applications by the same inventors Serial Numbers 200,051, 200,052 and 200,054, filed December 9, 1950.

We claim:

1. Combustion apparatus comprising an outer casing adapted to resist internal pressure, an inner wall disposed within the outer casing, surrounded by a gas flow passage and enclosing a combustion and mixing chamber arranged to receive fuel at one end thereof and provided with an outlet for combustion and tempering gases at the other end thereof, which inner wall is formed with gaseous fluid inlet means spaced axially of said chamber including a plurality of ports in the wall and arranged to direct streams of said fluid toward the fuel receiving end of said chamber and having associated therewith means for regulating the effective flow area of said ports.

2. Combustion apparatus as claimed in claim 1, wherein said flow area regulating means adjacent said ports are provided for varying the effective width of the ports.

3. Combustion apparatus as claimed in claim 1, wherein said flow area regulating means associated with each of said ports are arranged for separately regulating the respective effective flow areas thereof.

4. Combustion apparatus as claimed in claim 1, wherein a plurality of ports extend around the wall and have associated therewith individual means for regulating the respective effective flow areas thereof, the said flow area regulating means being operable together but simultaneously effective to restrict said ports different amounts in their regulating actions.

5. Combustion apparatus comprising an outer casing adapted to resist internal pressure, an inner wall disposed within the outer casing surrounded by a gas flow passage and enclosing a combustion and mixing chamber arranged to receive fuel at one end thereof and provided with an outlet for combustion and tempering gases at the other end thereof, said inner wall being provided with a plurality of circumferential ports, at least some of said ports being formed by frusto-conical sleeve-like rings with neighboring portions thereof overlapping to define at least one of said ports into which a ring of tapering cross-section is movable to restrict the port a selected amount.

6. Combustion apparatus as claimed in claim 1, wherein the ports in the inner wall are annular and a ring extending around the wall is movable axially to close said annular port to selected degree.

7. Combustion apparatus as claimed in claim 1, wherein the ports are associated with internal deflecting means inclined to the inner surface of the wall and said flow area regulating means may be moved axially of said combustion chamber towards one or the other side of the ports in order to close the ports to a selected amount.

8. Combustion apparatus comprising an outer casing adapted to resist internal pressure, an inner wall disposed within the outer casing surrounded by a tempering gas flow passage and enclosing a combustion and mixing chamber arranged to receive fuel at one end thereof and provided with an outlet for combustion and tempering gases at the other end thereof, said inner wall including a helical strip formed with one edge nearer the longitudinal axis of the chamber than the other edge and with adjacent turns overlapping to form a port for directing tempering gas into the chamber, and means for varying the overlap of the adjacent edges.

9. Combustion apparatus according to claim 1, wherein at least one of said ports is positioned adjacent the outlet from said combustion and mixing chamber for the admission of tempering gaseous fluid to said chamber.

10. Combustion apparatus comprising spaced inner and outer walls defining a gaseous tempering fluid flow passageway therebetween and enclosing a combustion chamber of circular cross-section, fuel injection means positioned axially of and in one end of said combustion chamber, means defining ports in and extending circumferentially of said inner wall, and a frusto-conical flange coaxial with said combustion chamber and positioned adjacent one side of said ports extending radially inwardly and axially of the inner wall toward said fuel injection means and arranged to direct gaseous tempering fluid flow from said ports along the inner surface of said inner wall.

11. Combustion apparatus according to claim 10, wherein the inner wall is formed with a plurality of spaced rows of ports extending around the wall, and one of said frusto-conical flanges associated with each of said ports.

12. Combustion apparatus according to claim 10, wherein said inner wall formed with a plurality of rows of ports and one of said flanges is provided in association with each row of ports extending around the wall.

13. Combustion apparatus comprising spaced inner and outer walls defining an annular gaseous tempering fluid flow passageway therebetween and enclosing a combustion chamber of circular cross-section having a fuel burner disposed in one end thereof, means defining ports in and extending circumferentially of said inner wall, and a frusto-conical flange coaxial with said combustion chamber and positioned adjacent one side of at least one of said ports and extending axially of said inner wall beyond the other side of said ports and opening toward said fuel burner end of said combustion chamber.

References Cited in the file of this patent

UNITED STATES PATENTS

| Number | Name | Date |
|---|---|---|
| 1,733,792 | Good | Oct. 29, 1929 |
| 1,781,236 | Lilge | Nov. 11, 1930 |
| 2,225,775 | Garrett | Dec. 24, 1940 |
| 2,457,157 | King | Dec. 28, 1948 |
| 2,464,791 | Bonvillian | Mar. 22, 1949 |
| 2,469,679 | Wyman | May 10, 1949 |
| 2,470,184 | Pfenninger | May 17, 1949 |
| 2,485,207 | Logan | Oct. 18, 1949 |
| 2,500,925 | Bonvillian et al. | Mar. 21, 1950 |
| 2,531,810 | Fyffe | Nov. 28, 1950 |
| 2,541,171 | McGarry | Feb. 13, 1951 |
| 2,547,619 | Buckland | Apr. 3, 1951 |
| 2,555,965 | Garber | June 5, 1951 |
| 2,569,446 | Bonvillian et al. | Oct. 2, 1951 |
| 2,603,064 | Williams | July 15, 1952 |